United States Patent
Luo

(10) Patent No.: US 6,720,397 B2
(45) Date of Patent: Apr. 13, 2004

(54) POLYMERIZATION PROCESS FOR PREPARING SYNDIOTACTIC 1,2-POLYBUTADIENE

(75) Inventor: Steven Luo, Akron, OH (US)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 10/079,205

(22) Filed: Feb. 20, 2002

(65) Prior Publication Data

US 2003/0166802 A1 Sep. 4, 2003

(51) Int. Cl.⁷ .............................. C08F 36/04; C08F 4/80
(52) U.S. Cl. .................... 526/169.1; 526/139; 526/165; 526/335
(58) Field of Search ............................. 526/139, 165, 526/169.1, 335

(56) References Cited

U.S. PATENT DOCUMENTS

| | | | |
|---|---|---|---|
| 3,419,505 A | 12/1968 | Marsico | 260/2 |
| 3,457,186 A | 7/1969 | Marsico | 252/429 |
| 3,457,250 A | 7/1969 | Gaeth | 260/94.3 |
| 3,498,963 A | 3/1970 | Ichikawa et al. | 260/94.3 |
| 3,725,373 A | 4/1973 | Yoo | 260/88.7 |
| 3,778,424 A | 12/1973 | Suginura et al. | 260/94.3 |
| 3,957,894 A | 5/1976 | Saeki et al. | 260/666 |
| 4,048,418 A | 9/1977 | Throckmorton | 526/138 |
| 4,168,357 A | 9/1979 | Throckmorton et al. | 526/139 |
| 4,168,374 A | 9/1979 | Throckmorton et al. | 526/139 |
| 4,182,813 A | 1/1980 | Makino et al. | 526/92 |
| 4,751,275 A | 6/1988 | Witte et al. | 526/139 |
| 5,239,023 A | 8/1993 | Hsu et al. | 526/141 |
| 5,356,997 A | 10/1994 | Massie, II et al. | 525/237 |
| 5,677,405 A | 10/1997 | Goodall et al. | 526/281 |
| 5,891,963 A | 4/1999 | Brookhart et al. | 525/326.1 |
| 5,919,875 A | 7/1999 | Luo et al. | 526/139 |
| 6,117,956 A | 9/2000 | Luo | 526/145 |
| 6,160,063 A | 12/2000 | Luo | 526/139 |
| 6,180,734 B1 | 1/2001 | Luo | 526/139 |
| 6,197,888 B1 | 3/2001 | Luo | 525/247 |
| 6,201,080 B1 | 3/2001 | Luo et al. | 526/139 |
| 6,211,313 B1 | 4/2001 | Luo | 526/139 |
| 6,277,779 B1 | 8/2001 | Luo | 502/154 |
| 6,281,305 B1 | 8/2001 | Luo | 526/139 |
| 6,284,702 B1 | 9/2001 | Luo | 502/154 |
| 6,288,183 B1 | 9/2001 | Luo | 526/153 |
| 6,320,004 B1 | 11/2001 | Luo | 526/126 |
| 6,331,594 B2 | 12/2001 | Luo | 525/247 |
| 2001/0007000 A1 | 7/2001 | Luo | 525/247 |
| 2001/0012878 A1 | 8/2001 | Luo | 526/139 |

FOREIGN PATENT DOCUMENTS

| | | |
|---|---|---|
| EP | 0 994 129 A1 | 4/2000 |
| WO | 00/75201 A1 | 12/2000 |
| WO | 01/32724 A1 | 5/2001 |
| WO | 02/066554 | 2/2002 |

OTHER PUBLICATIONS

English Abstract of Japanese Patent No. 45011154.
English Abstract of Japanese Patent No. 48064178.
English Abstract of Japanese Patent No. 73006939.
"Syndiotactic 1,2–Polybutadiene with Co–CS2 Catalyst System I. Preparation Properties and Application of Highly Crystalline Syndiotactic 1,2–Polybutadiene, II. Catalyst for Stereospecific Polymerization of Butadiene to Syndiotactic 1,2–Polybutadiene, III. 1H and 13C–NMR Study of Highly Syndiotactic 1,2–Polybutadiene and IV Mechanism of Syndiotactic Polymerization of Butadiene with Cobalt Compounds–Organoaluminum–CS2," Journal of Polymer Science: Polymer Chemistry Edition, by H. Ashitaka et al., vol. 21, pp. 1853–1860 and 1951–1995, (1983).
Comprehensive Polymer Science, by Porri and Giarrusso, Pergamon Press, Oxford, vol. 4, pp. 53, (1989).

*Primary Examiner*—Caixia Lu
(74) *Attorney, Agent, or Firm*—Arthur Reginelli

(57) ABSTRACT

A process for synthesizing syndiotactic 1,2-polybutadiene, the process comprising the steps of (1) polymerizing monomer consisting essentially of 1,3-butadeine monomer within an organic solvent that includes at least 50% by weight of aliphatic solvent by using an iron-based catalyst composition, where said step of polymerizing occurs at a temperature above about 65° C., thereby forming a supersaturated solution of syndiotactic 1,2-polybutadiene, (2) maintaining the supersaturated solution of syndiotactic 1,2-polybutadiene at a temperature above about 65° C. until isolation of the syndiotactic 1,2-polybutadiene is desired, and (3) isolating the syndiotactic 1,2-polybutadiene from the supersaturated solution.

18 Claims, No Drawings

POLYMERIZATION PROCESS FOR PREPARING SYNDIOTACTIC 1,2-POLYBUTADIENE

FIELD OF THE INVENTION

This invention relates to a process for the synthesis of syndiotactic 1,2-polybutadiene.

BACKGROUND OF THE INVENTION

Syndiotactic 1,2-polybutadiene is a high-vinyl polybutadiene that has a stereoregular structure in which the side-chain vinyl groups are located alternately on the opposite sides in relation to the polymeric main chain. As a result, syndiotactic 1,2-polybutadiene is a crystalline thermoplastic resin that uniquely exhibits the properties of both plastics and rubber, and therefore it has many uses. For example, films, fibers, and various molded articles can be made from syndiotactic 1,2-polybutadiene. It can also be blended into and co-cured with natural or synthetic rubbers in order to improve the properties thereof.

Generally, syndiotactic 1,2-polybutadiene has a melting temperature within the range of about 80° C. to about 215° C., depending on the 1,2-linkage content and syndiotacticity. The physical properties and processing characteristics of syndiotactic 1,2-polybutadiene are affected by its melting temperature. Syndiotactic 1,2-polybutadiene having a relatively high melting temperature is generally characterized by having better mechanical properties but is more difficult to process due to the high temperature required to melt the polymer. On the other hand, syndiotactic 1,2-polybutadiene having a relatively low melting temperature is easier to process and can be readily mixed with elastomers, especially during mechanical mixing.

Very useful iron-based catalysts for the synthesis of syndiotactic 1,2-polybutadiene have recently been developed. Among the many advantages of these catalyst systems is their high activity in non-aromatic and non-halogenated solvents such as aliphatic and cycloaliphatic solvents, which are environmentally preferred.

Unfortunately, syndiotactic 1,2-polybutadiene has relatively low solubility in aliphatic and cycloaliphatic solvents, especially where the syndiotactic 1,2-polybutadiene has a melting temperature above about 100° C. In fact, when synthesized in aliphatic solvents, syndiotactic 1,2-polybutadiene quickly precipitates from solution and forms a highly swollen mass of polymer. As a result, a common technical difficulty is that the polymerization mixture is an extremely thick slurry or gelatin at commercially desirable polymer product concentrations, which is typically about 10% to about 25% by weight. These slurries or gelatins are difficult to stir and transfer, and thereby diminish heat transfer efficiency and interfere with proper process control. These slurries or gelatins also clog transfer lines, and contribute to reactor fouling due to the undesirable build-up of insoluble polymer on the baffles, agitator blades, agitator shafts, and walls of the polymerization reactor. The reactor must therefore be cleaned on a regular basis, which results in frequent shutdowns of continuous processes and serious limitations of the run length of batch processes.

One useful solution to this problem is to synthesize syndiotactic 1,2-polybutadiene within a rubber cement. For example, iron-based catalysts have recently been used to synthesize syndiotactic 1,2-polybutadiene within a polymer cement that includes a rubber, such as cis-1,4-polybutadiene, and an aliphatic solvent. The polymerization process alleviates the problems associated with the insolubility of syndiotactic 1,2-polybutadiene including reactor fouling. While this has proven to be a useful approach, there remains a need to develop a process for producing neat syndiotactic 1,2-polybutadiene within aliphatic solvents without the difficulties associated with polymer insolubility and reactor fouling.

SUMMARY OF THE INVENTION

In general the present invention provides a process for synthesizing syndiotactic 1,2-polybutadiene, the process comprising the steps of (1) polymerizing monomer consisting essentially of 1,3-butadeine monomer within an organic solvent that includes at least 50% by weight of aliphatic solvent by using an iron-based catalyst composition, where said step of polymerizing occurs at a temperature above about 65° C., thereby forming a supersaturated solution of syndiotactic 1,2-polybutadiene, (2) maintaining the supersaturated solution of syndiotactic 1,2-polybutadiene at a temperature above about 65° C. until isolation of the syndiotactic 1,2-polybutadiene is desired, and (3) isolating the syndiotactic 1,2-polybutadiene from the supersaturated solution.

The present invention also includes a process for synthesizing syndiotactic 1,2-polybutadiene, the process comprising the steps of (1) polymerizing 1,3-butadiene monomer within an aliphatic solvent by using an iron-based catalyst composition, where said step of polymerizing occurs at a temperature above about 65° C., thereby forming a supersaturated solution of syndiotactic 1,2-polybutadiene, (2) maintaining the supersaturated solution of syndiotactic 1,2-polybutadiene at a temperature above about 65° C. until isolation of the syndiotactic 1,2-polybutadiene is desired, and (3) isolating the syndiotactic 1,2-polybutadiene from the supersaturated solution.

The present invention further includes a process for synthesizing syndiotactic 1,2-polybutadiene wherein an iron-based catalyst system is employed to polymerize 1,3-butadiene monomer within an organic solvent comprising an aliphatic solvent, the improvement comprising (1) conducting the polymerization at a temperature above 65° C. to form a supersaturated solution of syndiotactic 1,2-polybutadiene, and (2) maintaining the supersaturated solution at a temperature above about 65° C. until isolation of the syndiotactic 1,2-polybutadiene is desired.

The discovery that a supersaturated solution of syndiotactic 1,2-polybutadiene can be achieved by synthesizing syndiotactic 1,2-polybutadiene at a high temperature overcomes the prior art problems associated with polymer insolubility within aliphatic solvents. Further, it has been discovered that this supersaturated solution can be maintained by maintaining the solution at the high temperature. The formation of this supersaturated solution offers many advantages including low cement viscosity, high polymer concentrations in the cement, improved heat transfer, increased production capacity, and improved transferability out of the reactor. Significantly, the long-term stability of the supersaturated solution alleviates the reactor fouling problem that is associated with the synthesis of syndiotactic polybutadiene 1,2-polybutadiene in aliphatic solvents. The supersaturated solution can be easily handled in a conventional solution polymerization reactor system. The process of this invention is particularly suitable for preparing syndiotactic 1,2-polybutadiene that has an intermediate melting temperature. This intermediate melting temperature syndiotactic 1,2-polybutadiene can be easily processed under mild conditions, and yet still possesses the adequate crystallinity that is required for mechanical properties.

DETAILED DESCRIPTION OF ILLUSTRATIVE EMBODIMENTS

The process of this invention includes polymerizing 1,3-butadiene monomer at a high temperature within an aliphatic solvent, which thereby forms a supersaturated solution of syndiotactic 1,2-polybutadiene. Following the polymerization, the supersaturated solution is maintained at a high temperature until the syndiotactic 1,2-polybutadiene is isolated from the solution. The process preferably employs an iron-based catalyst that is particularly suitable for preparing syndiotactic 1,2-polybutadiene having a melting temperature from about 120° C. to about 165° C.

The polymerization of 1,3-butadiene monomer into syndiotactic 1,2-polybutadiene according to this invention occurs within an organic solvent comprising an aliphatic solvent. The polymerization is conducted at a sufficiently high temperature so that the resulting polymer cement is a supersaturated solution that contains no appreciable amounts of polymer precipitate. This supersaturated solution is thermodynamically unstable because, once the polymer precipitates from the solution upon cooling, the polymer cannot be dissolved to reform the solution. But, it has been unexpectedly discovered that as long as the supersaturated solution is maintained at a high temperature, it is kinetically stable for a long period of time. The supersaturated solution has low viscosity and flows easily and therefore can be easily handled by a conventional solution-polymerization reactor system. The long-term stability of the supersaturated solution provides a sufficient window of time for transferring the polymer cement out of the reactor and subsequently isolating the polymer product from the cement without the risks of fouling equipment and clogging transfer pipes.

The aliphatic solvent may include both aliphatic or cycloaliphatic hydrocarbons and mixtures thereof. These hydrocarbons may be collectively referred to as aliphatic solvents. The aliphatic hydrocarbons can be linear or branched. The cycloaliphatic hydrocarbons may contain linear or branched organic substituents on one or more of the ring carbon atoms. Some representative examples of suitable aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, mineral spirits, and the like. Some representative examples of suitable cycloaliphatic hydrocarbons include cyclopentane, cyclohexane, methylcyclopentane, methylcyclohexane, and the like. Commercial mixtures of the above hydrocarbons may also be used.

On the grounds of availability and economic considerations, the preferred solvent for use as a polymerization medium in the present process is technical-grade hexane, which is also commonly referred to as "hexanes". Technical-grade hexane is basically an industrial raw hexane cut that is taken from a distillation column typically treating crude oil. In general, commercially available technical-grade hexane compositions comprise a mixture of n-hexane (often the major component); other linear or branched aliphatic hydrocarbons such as n-pentane, n-heptane, 2-methylpentane, 3-methylpentane, 2,2-dimethylbutane, and 2,3-dimethylbutane; cycloaliphatic hydrocarbons such as cyclohexane and methylcyclohexane; and much lesser amounts of aromatic hydrocarbons such as benzene.

If desired, additional amounts of cycloaliphatic or aromatic hydrocarbons can be added to technical hexane so as to adjust the solubility parameter of the mixed solvent. Generally, a higher percentage of cycloaliphatic and aromatic hydrocarbons in the mixed solvent allows a higher-melting syndiotactic 1,2-polybutadiene to stay in a supersaturated solution state during the polymerization and allows a lower polymerization temperature to be employed to achieve the supersaturated solution state.

Advantageously, the organic solvent employed includes at least 50% by weight of aliphatic or cycloaliphatic hydrocarbons, i.e., aliphatic solvents, more advantageously at least 70% by weight of aliphatic solvents, even more advantageously at least 85% by weight of aliphatic solvents, and still more advantageously at least 95% by weight of aliphatic solvents.

The polymerization is conducted at a high temperature, which is a temperature that is sufficient to maintain the polymerization mixture in a supersaturated solution state. The minimum polymerization temperature to achieve the supersaturated solution may vary based upon the melting temperature of the polymer, the concentration of the polymer within the solution, and the solvent employed. Where the syndiotactic 1,2-polybutadiene has a melting temperature from about 120° C. to about 165° C., and the solvent includes at least 95% by weight of aliphatic solvent, the polymerization medium should be maintained at a temperature of at least about 65° C., preferably at least about 70° C., and even more preferably at least about 80° C. Where the syndiotactic 1,2-polybutadiene has a melting temperature greater than about 165° C., these minimum temperature requirements should generally be increased by about 10° C. for an equivalent increase in melting temperature. Also, an aromatic solvent or a blend of aromatic and aliphatic solvents may be required where the melting temperature of the polymer is greater than about 180° C. Where the solvent employed includes from about 25% to about 50% by weight of an aromatic solvent, the minimum polymerization temperature may be decreased by about 10° C. to about 20° C.

The concentration of the 1,3-butadiene monomer within the polymerization medium at the beginning of the polymerization is not limited to any special range. Generally, the concentration of the 1,3-butadiene monomer may range from about 3% to about 50% by weight, preferably from about 5% to about 40% by weight, and more preferably from about 10 to about 30% by weight.

The polymerization is preferably conducted under anaerobic conditions with an inert protective gas such as nitrogen, argon, or helium, with moderate to vigorous agitation. The polymerization pressure employed may vary widely, although a preferred pressure range is from about 1 atmosphere to about 10 atmospheres.

The preferred catalyst system employed within this invention is an iron-based catalyst system that is formed by combining (a) an iron-containing compound, (b) a hydrogen phosphite, and (c) an organoaluminum compound. In addition to the three catalyst ingredients (a), (b), and (c), other organometallic compounds or Lewis bases can also be added, if desired. Iron-based catalyst systems are disclosed in U.S. Pat. Nos. 6,180,734, 6,211,313, 6,277,779, and 6,288,183, which are incorporated herein by reference.

The iron atom in the iron-containing compounds can be in various oxidation states including but not limited to the 0, +2, +3, and +4 oxidation states. Divalent iron compounds (also called ferrous compounds), wherein the iron atom is in the +2 oxidation state, and trivalent iron compounds (also called ferric compounds), wherein the iron atom is in the +3 oxidation state, are preferred. Suitable iron-containing compounds include, but are not limited to, iron carboxylates, iron organophosphates, iron organophosphonates, iron organophosphinates, iron carbamates, iron dithiocarbamates, iron xanthates, iron α-diketonates, iron alkoxides or aryloxides, and organoiron compounds.

Suitable iron carboxylates include iron(II) formate, iron (III) formate, iron(II) acetate, iron(III) acetate, iron(II) acrylate, iron(III) acrylate, iron(II) methacrylate, iron(III) methacrylate, iron(II) valerate, iron(III) valerate, iron(II) gluconate, iron(III) gluconate, iron(II) citrate, iron(III) citrate, iron(II) fumarate, iron(III) fumarate, iron(II) lactate, iron(III) lactate, iron(II) maleate, iron(III) maleate, iron(II) oxalate, iron(III) oxalate, iron(II) 2-ethylhexanoate, iron(III) 2-ethylhexanoate, iron(II) neodecanoate, iron(III) neodecanoate, iron(II) naphthenate, iron(III) naphthenate, iron(II) stearate, iron(III) stearate, iron(II) oleate, iron(III) oleate, iron(II) benzoate, iron(III) benzoate, iron(II) picolinate, and iron(III) picolinate.

Suitable iron organophosphates include iron(II) dibutyl phosphate, iron(III) dibutyl phosphate, iron(II) dipentyl phosphate, iron(III) dipentyl phosphate, iron(II) dihexyl phosphate, iron(III) dihexyl phosphate, iron(II) diheptyl phosphate, iron(III) diheptyl phosphate, iron(II) dioctyl phosphate, iron(III) dioctyl phosphate, iron(II) bis(1-methylheptyl) phosphate, iron(III) bis(1-methylheptyl) phosphate, iron(II) bis(2-ethylhexyl) phosphate, iron(III) bis(2-ethylhexyl) phosphate, iron(II) didecyl phosphate, iron (III) didecyl phosphate, iron(II) didodecyl phosphate, iron (III) didodecyl phosphate, iron(II) dioctadecyl phosphate, iron(III) dioctadecyl phosphate, iron(II) dioleyl phosphate, iron(III) dioleyl phosphate, iron(II) diphenyl phosphate, iron(III) diphenyl phosphate, iron(II) bis(p-nonylphenyl) phosphate, iron(III) bis(p-nonylphenyl) phosphate, iron(II) butyl (2-ethylhexyl) phosphate, iron (III) butyl (2-ethylhexyl) phosphate, iron(II) (1-methylheptyl) (2-ethylhexyl) phosphate, iron(III) (1-methylheptyl) (2-ethylhexyl) phosphate, iron(II) (2-ethylhexyl) (p-nonylphenyl) phosphate, and iron(III) (2-ethylhexyl) (p-nonylphenyl) phosphate.

Suitable iron organophosphonates include iron(II) butyl phosphonate, iron(III) butyl phosphonate, iron(II) pentyl phosphonate, iron(III) pentyl phosphonate, iron(II) hexyl phosphonate, iron(III) hexyl phosphonate, iron(II) heptyl phosphonate, iron(III) heptyl phosphonate, iron(II) octyl phosphonate, iron(III) octyl phosphonate, iron(II) (1-methylheptyl) phosphonate, iron(III) (1-methylheptyl) phosphonate, iron(II) (2-ethylhexyl) phosphonate, iron(III) (2-ethylhexyl) phosphonate, iron(II) decyl phosphonate, iron(III) decyl phosphonate, iron(II) dodecyl phosphonate, iron(III) dodecyl phosphonate, iron(II) octadecyl phosphonate, iron(III) octadecyl phosphonate, iron(II) oleyl phosphonate, iron(III) oleyl phosphonate, iron(II) phenyl phosphonate, iron(III) phenyl phosphonate, iron(II) (p-nonylphenyl)phosphonate, iron(III) (p-nonylphenyl) phosphonate, iron(II) butyl butylphosphonate, iron(III) butyl butylphosphonate, iron(II) pentyl pentylphosphonate, iron (II) pentyl pentylphosphonate, iron(II) hexyl hexylphosphonate, iron(III) hexyl hexylphosphonate, iron (II) heptyl heptylphosphonate, iron(III) heptyl heptylphosphonate, iron(II) octyl octylphosphonate, iron (III) octyl octylphosphonate, iron(II) (1-methylheptyl) (1-methylheptyl)phosphonate, iron(III) (1-methylheptyl) (1-methylheptyl)phosphonate, iron(II) (2-ethylhexyl) (2-ethylhexyl)phosphonate, iron(III) (2-ethylhexyl) (2-ethylhexyl)phosphonate, iron(II) decyl decylphosphonate, iron(III) decyl decylphosphonate, iron (II) dodecyl dodecylphosphonate, iron(III) dodecyl dodecylphosphonate, iron(II) octadecyl octadecylphosphonate, iron(III) octadecyl octadecylphosphonate, iron(II) oleyl oleylphosphonate, iron (III) oleyl oleylphosphonate, iron(II) phenyl phenylphosphonate, iron(III) phenyl phenylphosphonate, iron(II) (p-nonylphenyl) (p-nonylphenyl)phosphonate, iron (III) (p-nonylphenyl) (p-nonylphenyl)phosphonate, iron(II) butyl (2-ethylhexyl)phosphonate, iron(III) butyl (2-ethylhexyl)phosphonate, iron(II) (2-ethylhexyl) butylphosphonate, iron(III) (2-ethylhexyl) butylphosphonate, iron (II) (1-methylheptyl) (2-ethylhexyl) phosphonate, iron(III) (1-methylheptyl) (2-ethylhexyl) phosphonate, iron(II) (2-ethylhexyl) (1-methylheptyl) phosphonate, iron(III) (2-ethylhexyl) (1-methylheptyl) phosphonate, iron(II) (2-ethylhexyl) (p-nonylphenyl) phosphonate, iron(III) (2-ethylhexyl) (p-nonylphenyl) phosphonate, iron(II) (p-nonylphenyl) (2-ethylhexyl) phosphonate, and iron(III) (p-nonylphenyl) (2-ethylhexyl) phosphonate.

Suitable iron organophosphinates include iron(II) butylphosphinate, iron(III) butylphosphinate, iron(II) pentylphosphinate, iron(III) pentylphosphinate, iron(II) hexylphosphinate, iron(III) hexylphosphinate, iron(II) heptylphosphinate, iron(III) heptylphosphinate, iron(II) octylphosphinate, iron(III) octylphosphinate, iron(II) (1-methylheptyl)phosphinate, iron(III) (1-methylheptyl) phosphinate, iron(II) (2-ethylhexyl)phosphinate, iron(III) (2-ethylhexyl)phosphinate, iron(II) decylphosphinate, iron (III) decylphosphinate, iron (II) dodecylphosphinate, iron (III) dodecylphosphinate, iron(II) octadecylphosphinate, iron(III) octadecylphosphinate, iron (II) oleylphosphinate, iron (III) oleylphosphinate, iron(II) phenylphosphinate, iron (III) phenylphosphinate, iron(II) (p-nonylphenyl) phosphinate, iron (III) (p-nonylphenyl)phosphinate, iron (II) dibutylphosphinate, iron(III) dibutylphosphinate, iron(II) dipentylphosphinate, iron(III) dipentylphosphinate, iron(II) dihexylphosphinate, iron(III) dihexylphosphinate, iron(II) diheptylphosphinate, iron(III) diheptylphosphinate, iron(II) dioctylphosphinate, iron(III) dioctylphosphinate, iron(II) bis (1-methylheptyl)phosphinate, iron (III) bis (1-methyiheptyl) phosphinate, iron (II) is (2-ethylhexyl)phosphinate, iron(III) bis(2-ethylhexyl)phosphinate, iron(II) didecylphosphinate, iron(III) didecylphosphinate, iron(II) didodecylphosphinate, iron(III) didodecylphosphinate, iron(II) dioctadecylphosphinate, iron(III) dioctadecylphosphinate, iron(II) dioleylphosphinate, iron(III) dioleylphosphinate, iron(II) diphenylphosphinate, iron(III) diphenylphosphinate, iron(II) bis(p-nonylphenyl) phosphinate, iron(III) bis(p-nonylphenyl)phosphinate, iron(II) butyl(2-ethylhexyl) phosphinate, iron(III) butyl(2-ethylhexyl)phosphinate, iron (II) (1-methylheptyl)(2-ethylhexyl)phosphinate, iron(III) (1-methylheptyl)h(2-ethylhexyl)phosphinate, iron(II) (2-ethylhexyl)(p-nonylphenyl)phosphinate, and iron(III) (2-ethylhexyl)(p-nonylphenyl)phosphinate.

Suitable iron carbamates include iron(II) dimethylcarbamate, iron(III) dimethylcarbamate, iron(II) diethylcarbamate, iron(III) diethylcarbamate, iron(II) diisopropylcarbamate, iron(III) diisopropylcarbamate, iron (II) dibutylcarbamate, iron(III) dibutylcarbamate, iron(II) dibenzylcarbamate, and iron(III) dibenzylcarbamate.

Suitable iron dithiocarbamates include iron(II) dimethyldithiocarbamate, iron(III) dimethyldithiocarbamate, iron(II) diethyldithiocarbamate, iron(III) diethyldithiocarbamate, iron(II) diisopropyldithiocarbamate, iron(III) diisopropyldithiocarbamate, iron(II) dibutyldithiocarbamate, iron(III) dibutyldithiocarbamate, iron(II) dibenzyldithiocarbamate, and iron(III) dibenzyldithiocarbamate. Suitable iron xanthates include iron II)

methylxanthate, iron(III) methylxanthate, iron(II) ethylxanthate, iron(III) ethylxanthate, iron(II) isopropylxanthate, iron(III) isopropylxanthate, iron(II) butylxanthate, iron(III) butylxanthate, iron(II) benzylxanthate, and iron(III) benzylxanthate.

Suitable iron α-diketonates include iron(II) acetylacetonate, iron(III) acetylacetonate, iron(II) trifluoroacetylacetonate, iron(III) trifluoroacetylacetonate, iron(II) hexafluoroacetylacetonate, iron(III) hexafluoroacetylacetonate, iron(II) benzoylacetonate, iron (III) benzoylacetonate, iron(II) 2,2,6,6-tetramethyl-3,5-heptanedionate, and iron(III) 2,2,6,6-tetramethyl-3,5-heptanedionate.

Suitable iron alkoxides or aryloxides include iron(II) methoxide, iron(III) methoxide, iron(II) ethoxide, iron(III) ethoxide, iron(II) isopropoxide, iron(III) isopropoxide, iron (II) 2-ethylhexoxide, iron(III) 2-ethylhexoxide, iron(II) phenoxide, iron(III) phenoxide, iron(II) nonylphenoxide, iron(III) nonylphenoxide, iron(II) naphthoxide, and iron(III) naphthoxide.

The term "organoiron compound" refers to any iron compound containing at least one iron-carbon bond. Suitable organoiron compounds include bis(cyclopentadienyl) iron(II) (also called ferrocene), bis (pentamethylcyclopentadienyl)iron(II) (also called decamethylferrocene), bis(pentadienyl)iron(II), bis(2,4-dimethylpentadienyl)iron(II), bis(allyl)dicarbonyliron(II), (cyclopentadienyl)(pentadienyl)iron(II), tetra(1-norbornyl) iron(IV), (trimethylenemethane)tricarbonyliron(II), bis (butadiene)carbonyliron(0), (butadiene)tricarbonyliron(0), and bis(cyclooctatetraene)iron(0).

Useful hydrogen phosphite compounds that can be employed as ingredient (b) of the iron-based catalyst composition are acyclic hydrogen phosphites, cyclic hydrogen phosphites, or mixtures thereof.

The acyclic hydrogen phosphites may be represented by the following keto-enol tautomeric structures:

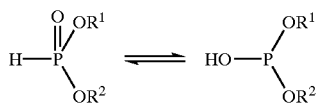

where $R^1$ and $R^2$, which may be the same or different, are mono-valent organic groups. Preferably, $R^1$ and $R^2$ are hydrocarbyl groups such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form these groups, up to 20 carbon atoms. These hydrocarbyl groups may contain heteroatoms such as, but not limited to, nitrogen, oxygen, silicon, sulfur, and phosphorus atoms. The acyclic hydrogen phosphites exist mainly as the keto tautomer (shown on the left), with the enol tautomer (shown on the right) being the minor species. The equilibrium constant for the above-mentioned tautomeric equilibrium is dependent upon factors such as the temperature, the types of $R^1$ and $R^2$ groups, the type of solvent, and the like. Both tautomers may be associated in dimeric, trimeric or oligomeric forms by hydrogen bonding. Either of the two tautomers or mixtures thereof can be employed as ingredient (b) of the catalyst composition.

Suitable acyclic hydrogen phosphites are dimethyl hydrogen phosphite, diethyl hydrogen phosphite, dibutyl hydrogen phosphite, dihexyl hydrogen phosphite, dioctyl hydrogen phosphite, didecyl hydrogen phosphite, didodecyl hydrogen phosphite, dioctadecyl hydrogen phosphite, bis(2,2,2-trifluoroethyl) hydrogen phosphite, diisopropyl hydrogen phosphite, bis(3,3-dimethyl-2-butyl) hydrogen phosphite, bis(2,4-dimethyl-3-pentyl) hydrogen phosphite, di-t-butyl hydrogen phosphite, bis(2-ethylhexyl) hydrogen phosphite, dineopentyl hydrogen phosphite, bis (cyclopropylmethyl) hydrogen phosphite, bis (cyclobutylmethyl) hydrogen phosphite, bis (cyclopentylmethyl) hydrogen phosphite, bis (cyclohexylmethyl) hydrogen phosphite, dicyclobutyl hydrogen phosphite, dicyclopentyl hydrogen phosphite, dicyclohexyl hydrogen phosphite, dimenthyl hydrogen phosphite, diphenyl hydrogen phosphite, dinaphthyl hydrogen phosphite, dibenzyl hydrogen phosphite, bis(1-naphthylmethyl) hydrogen phosphite, diallyl hydrogen phosphite, dimethallyl hydrogen phosphite, dicrotyl hydrogen phosphite, ethyl butyl hydrogen phosphite, methyl hexyl hydrogen phosphite, methyl neopentyl hydrogen phosphite, methyl phenyl hydrogen phosphite, methyl cyclohexyl hydrogen phosphite, methyl benzyl hydrogen phosphite, and the like. Mixtures of the above dihydrocarbyl hydrogen phosphites may also be utilized.

The cyclic hydrogen phosphites contain a divalent organic group that bridges between the two oxygen atoms that are singly-bonded to the phosphorus atom. These cyclic hydrogen phosphites may be represented by the following keto-enol tautomeric structures:

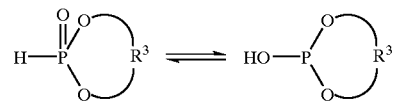

where $R^3$ is a divalent organic group. Preferably, $R^3$ is a hydrocarbylene group such as, but not limited to, alkylene, cycloalkylene, substituted alkylene, substituted cycloalkylene, alkenylene, cycloalkenylene, substituted alkenylene, substituted cycloalkenylene, arylene, and substituted arylene groups, with each group preferably containing from 1 carbon atom, or the appropriate minimum number of carbon atoms to form these groups, up to 20 carbon atoms. These hydrocarbylene groups may contain heteroatoms such as, but not limited to, nitrogen, oxygen, silicon, sulfur, and phosphorus atoms. The cyclic hydrogen phosphites exist mainly as the keto tautomer (shown on the left), with the enol tautomer (shown on the right) being the minor species. The equilibrium constant for the above-mentioned tautomeric equilibrium is dependent upon factors such as the temperature, the type of $R^3$ group, the type of solvent, and the like. Both tautomers may be associated in dimeric, trimeric or oligomeric forms by hydrogen bonding. Either of the two tautomers or mixtures thereof can be employed as ingredient (b) of the catalyst composition.

The cyclic hydrogen phosphites may be synthesized by the transesterification reaction of an acyclic dihydrocarbyl hydrogen phosphite (usually dimethyl hydrogen phosphite or diethyl hydrogen phosphite) with an alkylene diol or an arylene diol. Procedures for this transesterification reaction are well known to those skilled in the art. Typically, the transesterification reaction is carried out by heating a mixture of an acyclic dihydrocarbyl hydrogen phosphite and an alkylene diol or an arylene diol. Subsequent distillation of the side-product alcohol (usually methanol or ethanol) that results from the transesterification reaction leaves the new-made cyclic hydrogen phosphite.

Suitable cyclic alkylene hydrogen phosphites are 2-oxo-(2H)-5-butyl-5-ethyl-1,3,2-dioxaphosphorinane, 2-oxo-(2H)-5,5-dimethyl-1,3,2-dioxaphosphorinane, 2-oxo-(2H)-1,3,2-dioxaphosphorinane, 2-oxo-(2H)-4-methyl-1,3,2-dioxaphosphorinane, 2-oxo-(2H)-5-ethyl-5-methyl-1,3,2-dioxaphosphorinane, 2-oxo-(2H)-5,5-diethyl-1,3,2-dioxaphosphorinane, 2-oxo-(2H)-5-methyl-5-propyl-1,3,2-dioxaphosphorinane, 2-oxo-(2H)-4-isopropyl-5,5-dimethyl-1,3,2-dioxaphosphorinane, 2-oxo-(2H) -4,6-dimethyl-1,3,2-dioxaphosphorinane, 2-oxo-(2H)-4-propyl-5-ethyl-1,3,2-dioxaphosphorinane, 2-oxo-(2H)-4-methyl-1,3,2-dioxaphospholane, 2-oxo-(2H)-4,5-dimethyl-1,3,2-dioxaphospholane, 2-oxo-(2H)-4,4,5,5-tetramethyl-1,3,2-dioxaphospholane, and the like. Mixtures of the above cyclic alkylene hydrogen phosphites may also be utilized.

Suitable cyclic arylene hydrogen phosphites are 2-oxo-(2H)-4,5-benzo-1,3,2-dioxaphospholane, 2-oxo-(2H)-4,5-(3'-methylbenzo)-1,3,2-dioxaphospholane, 2-oxo-(2H)-4,5-(4'-methylbenzo)-1,3,2-dioxaphospholane, 2-oxo-(2H)-4,5-(4'-tert-butylbenzo)-1,3,2-dioxaphospholane, 2-oxo-(2H)-4,5-naphthalo-1,3,2-dioxaphospholane, and the like. Mixtures of the above cyclic arylene hydrogen phosphites may also be utilized.

The iron-based catalyst composition further comprises an organoaluminum compound, which has been designated as ingredient (c). As used herein, the term "organoaluminum compound" refers to any aluminum compound containing at least one covalent aluminum-carbon bond. It is generally advantageous to employ organoaluminum compounds that are soluble in a hydrocarbon solvent.

A preferred class of organoaluminum compounds that can be utilized is represented by the general formula $AlR_nX_{3-n}$, where each R, which may be the same or different, is a mono-valent organic group, where each X, which may be the same or different, is a hydrogen atom, a carboxylate group, an alkoxide group, or an aryloxide group, and where n is an integer of 1 to 3. Preferably, each R is a hydrocarbyl group such as, but not limited to, alkyl, cycloalkyl, aryl, aralkyl, alkaryl, and allyl groups, with each group preferably containing from 1 carbon atom, or the appropriate minimum number of carbon atoms to form these groups, up to about 20 carbon atoms. These hydrocarbyl groups may contain heteroatoms such as, but not limited to, nitrogen, oxygen, silicon, sulfur, and phosphorus atoms. Preferably, each X is a carboxylate group, an alkoxide group, or an aryloxide group, with each group preferably containing from 1 carbon atom, or the appropriate minimum number of carbon atoms to form these groups, up to about 20 carbon atoms.

Suitable types of organoaluminum compounds that can be utilized include, but are not limited to, trihydrocarbylaluminum, dihydrocarbylaluminum hydride, hydrocarbylaluminum dihydride, dihydrocarbylaluminum halide, hydrocarbylaluminum dihalide, dihydrocarbylaluminum carboxylate, hydrocarbylaluminum bis (carboxylate), dihydrocarbylaluminum alkoxide, hydrocarbylaluminum dialkoxide, dihydrocarbylaluminum aryloxide, hydrocarbylaluminum diaryloxide, and the like, and mixtures thereof. Trihydrocarbylaluminum compounds are generally preferred.

Examples of organoaluminum compounds that can be utilized include trimethylaluminum, triethylaluminum, triisobutylaluminum, tri-n-propylaluminum, triisopropylaluminum, tri-n-butylaluminum, tri-n-hexylaluminum, tri-n-octylaluminum, tricyclohexylaluminum, triphenylaluminum, tri-p-tolylaluminum, tribenzylaluminum, diethylphenylaluminum, diethyl-p-tolylaluminum, diethylbenzylaluminum, ethyldiphenylaluminum, ethyldi-p-tolylaluminum, ethyldibenzylaluminum, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride, ethylaluminum dihydride, n-propylaiu minum dihydride, isopropylaluminum dihydride, n-butylaluminum dihydride, isobutylaluminum dihydride, n-octylaluminum dihydride, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis (stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds that can be utilized is aluminoxanes. Aluminoxanes are well known in the art and comprise oligomeric linear aluminoxanes that can be represented by the general formula:

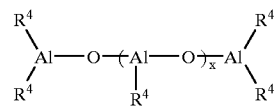

and oligomeric cyclic aluminoxanes that can be represented by the general formula:

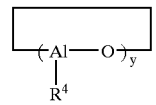

where x is an integer of 1 to about 100, preferably about 10 to about 50; y is an integer of 2 to about 100, preferably about 3 to about 20; and each $R^4$, which may be the same or different, is a mono-valent organic group. Preferably, each $R^4$ is a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atoms, or the appropriate minimum number of carbon atoms to form these groups, up to about 20 carbon atoms. These hydrocarbyl groups may contain heteroatoms such as, but not limited to, nitrogen, oxygen, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

In general, aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is added to the monomer or monomer solution that is to be oligomerized, and then water is added.

Examples of aluminoxane compounds that can be utilized include methylaluminoxane (MAO), modified methylaluminoxane (MMAO), ethylaluminoxane, butylaluminoxane, isobutylaluminoxane, and the like, and mixtures thereof. Isobutylaluminoxane is particularly useful because of its availability and its solubility in aliphatic and cycloaliphatic hydrocarbon solvents. Modified methylaluminoxane can be formed by substituting about 20–80% of the methyl groups of methylaluminoxane with $C_2$ to $C_{12}$ hydrocarbyl groups, preferably with isobutyl groups, by using techniques known to those skilled in the art.

The iron-based catalyst composition has a very high catalytic activity for polymerizing 1,3-butadiene into syndiotactic 1,2-polybutadiene over a wide range of total catalyst concentrations and catalyst ingredient ratios. The polymers having the most desirable properties, however, are obtained within a narrower range of total catalyst concentrations and catalyst ingredient ratios. Further, it is believed that the three catalyst ingredients (a), (b), and (c) interact to form an active catalyst species. Accordingly, the optimum concentration for any one catalyst ingredient is dependent upon the concentrations of the other two catalyst ingredients. The molar ratio of the hydrogen phosphite to the iron-containing compound (P/Fe) can be varied from about 0.5:1 to about 50:1, more preferably from about 1:1 to about 25:1, and even more preferably from about 2:1 to about 10:1. The molar ratio of the organoaluminum compound to the iron-containing compound (Al/Fe) can be varied from about 1:1 to about 100:1, more preferably from about 11:1 to about 50:1, even more preferably from about 12:1 to about 25:1, and still more preferably from about 15:1 to about 20:1.

The iron-based catalyst composition is preferably formed by combining the three catalyst ingredients (a), (b), and (c). Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the ingredients that is caused by physical or chemical forces of attraction, a chemical reaction product of the ingredients, or a combination of the foregoing.

The iron-based catalyst composition can be formed by combining or mixing the catalyst ingredients or components by using, for example, one of the following methods.

First, the catalyst composition may be formed in situ by adding the three catalyst ingredients to a solution containing monomer and solvent, or simply bulk monomer, in either a stepwise or simultaneous manner. When adding the catalyst ingredients in a stepwise manner, the sequence in which the ingredients are added is not critical. Preferably, however, the iron-containing compound is added first, followed by the hydrogen phosphite, and finally followed by the organoaluminum compound.

Second, the three catalyst ingredients may be pre-mixed outside the polymerization system at an appropriate temperature, which is generally from about −20° C. to about 80° C., and the resulting catalyst composition is then added to the monomer solution.

Third, the catalyst composition may be pre-formed in the presence of monomer. That is, the three catalyst ingredients are pre-mixed in the presence of a small amount of monomer at an appropriate temperature, which is generally from about −20° C. to about 80° C. The amount of monomer that is used for the catalyst pre-forming can range from about 1 to about 500, and preferably from about 4 to about 100 moles per mole of the iron-containing compound. The resulting catalyst composition is then added to the remainder of the monomer that is to be polymerized.

Fourth, the catalyst composition may be formed by using a two-stage procedure. The first stage involves reacting the iron-containing compound with the organoaluminum compound in the presence of a small amount of monomer at an appropriate temperature, which is generally from about −20° C. to about 80° C. In the second stage, the foregoing reaction mixture and the hydrogen phosphite are charged in either a stepwise or simultaneous manner to the remainder of the monomer that is to be polymerized.

Fifth, an alternative two-stage procedure may also be employed. An iron-ligand complex is first formed by pre-combining the iron-containing compound with the hydrogen phosphite. Once formed, this iron-ligand complex is then combined with the organoaluminum compound to form the active catalyst species. The iron-ligand complex can be formed separately or in the presence of the monomer that is to be polymerized. This complexation reaction can be conducted at any convenient temperature at normal pressure, but for an increased rate of reaction, it is preferable to perform this reaction at room temperature or above. The temperature and time used for the formation of the iron-ligand complex will depend upon several variables including the particular starting materials and the solvent employed. Once formed, the iron-ligand complex can be used without isolation from the complexation reaction mixture. If desired, however, the iron-ligand complex may be isolated from the complexation reaction mixture before use.

When a solution of the iron-based catalyst composition or one or more of the catalyst ingredients is prepared outside the polymerization system as set forth in the foregoing methods, an organic solvent or carrier is preferably employed. The organic solvents may serve to dissolve the catalyst composition or ingredients, or the solvent may simply serve as a carrier in which the catalyst composition or ingredients may be suspended. Desirably, an organic solvent that is inert with respect to the catalyst composition is used.

Advantageously, the iron-based catalyst system employed in this invention can be manipulated to vary the characteristics of the resulting syndiotactic 1,2-polybutadiene. Namely, the syndiotactic 1,2-polybutadiene made by the process of this invention can have various melting temperatures, molecular weights, 1,2-linkage contents, and syndiotacticities, all of which are dependent upon the selection of the catalyst ingredients and the ingredient ratios. For example, the use of acyclic hydrogen phosphites in lieu of cyclic hydrogen phosphites will increase the melting temperature, molecular weight, 1,2-linkage content, and syndiotacticity of the syndiotactic 1,2-polybutadiene. Further, when an acyclic dihydrocarbyl hydrogen phosphite is employed, the melting temperature, 1,2-linkage content, and syndiotacticity of the syndiotactic 1,2-polybutadiene can be increased by synthesizing the polymer with a dihydrocarbyl hydrogen phosphite that contains sterically bulky hydrocarbyl groups in lieu of sterically less bulky hydrocarbyl groups. Likewise, the melting temperature, molecular weight, 1,2-linkage content, and syndiotacticity of the syndiotactic 1,2-polybutadiene can be increased by employing an organoaluminum compound containing sterically bulky hydrocarbyl groups in lieu of sterically less bulky hydrocarbyl groups. Non-limiting examples of sterically bulky hydrocarbyl groups include isopropyl, isobutyl, t-butyl, neopentyl, 2-ethylhexyl, cyclohexyl, 1-methylcyclopentyl, and 2,6-dimethylphenyl groups. Non-limiting examples of sterically less bulky hydrocarbyl groups include methyl, fluoromethyl, ethyl, n-propyl, n-butyl, n-pentyl, n-hexyl, and n-octyl groups. The manipulation of the characteristics of the syndiotactic 1,2-polybutadiene by varying catalyst ingredients and ratios is described in greater detail in U.S. Pat. Nos. 6,180,734; 6,211,313; 6,277,779; and 6,288,183; and co-pending patent applications U.S. Ser. Nos. 09/475,343 and 09/850,240.

The total catalyst concentration of the iron-based catalyst composition to be employed in the polymerization mass depends on the interplay of various factors such as the purity of the ingredients, the polymerization temperature, the polymerization rate and conversion desired, and many other factors. Accordingly, the specific total catalyst concentration cannot be definitively set forth except to say that catalytically effective amounts of the respective catalyst ingredients should be used. Generally, the amount of the iron-containing compound used can be varied from about 0.01 to about 2 mmol per 100 g of 1,3-butadiene monomer, with a more preferred range being from about 0.02 to about 1.0 mmol per 100 g of 1,3-butadiene monomer, and a most preferred range being from about 0.05 to about 0.5 mmol per 100 g of 1,3-butadiene monomer.

In polymerizing 1,3-butadiene monomer, a molecular weight regulator may be employed to control the molecular weight of the polymer to be produced. As a result, the scope of the polymerization system can be expanded in such a manner that it can be used for the production of syndiotactic 1,2-polybutadiene having a wide range of molecular weights. Suitable types of molecular weight regulators that can be utilized include, but are not limited to, α-olefins such as ethylene, propylene, 1-butene, 1-pentene, 1-hexene, 1-heptene, and 1-octene; accumulated diolefins such as allene and 1,2-butadiene; nonconjugated diolefins such as 1,6-octadiene, 5-methyl-1,4-hexadiene, 1,5-cyclooctadiene, 3,7-dimethyl-1,6-octadiene, 1,4-cyclohexadiene, 4-vinylcyclohexene, 1,4-pentadiene, 1,4-hexadiene, 1,5-hexadiene, 1,6-heptadiene, 1,2-divinylcyclohexane, 5-ethylidene-2-norbornene, 5-methylene-2-orbornene, 5-vinyl-2-norbornene, dicyclopentadiene, and 1,2,4-trivinylcyclohexane; acetylenes such as acetylene, methylacetylene, and vinylacetylene; and mixtures thereof. The amount of the molecular weight regulator used, expressed in parts per hundred parts by weight of the 1,3-butadiene monomer (phm), is from about 0.01 to about 10 phm, preferably from about 0.02 to about 2 phm, and more preferably from about 0.05 to about 1 phm.

The molecular weight of the polymer to be produced can also be effectively controlled by conducting the polymerization of 1,3-butadiene monomer in the presence of hydrogen gas. In this case, the partial pressure of hydrogen gas is preferably from about 0.01 to about 50 atmospheres.

The polymerization of 1,3-butadiene monomer may be carried out as a batch process, a continuous process, or a semi-continuous process. In the semi-continuous process, monomer is intermittently charged as needed to replace that monomer already polymerized. The heat of polymerization may be removed by external cooling, cooling by evaporation of the monomer or the solvent, or a combination of the two methods.

Once a desired conversion is achieved, the polymerization can be stopped by adding a polymerization terminator that inactivates the catalyst. Typically, the terminator employed is a protic compound, which includes, but is not limited to, an alcohol, a carboxylic acid, an inorganic acid, water, or a mixture thereof. An antioxidant such as 2,6-di-tert-butyl-4-methylphenol may be added along with, before or after the addition of the terminator. The amount of the antioxidant employed is usually in the range of 0.2% to 1% by weight of the polymer product.

Following polymerization, the supersaturated solution of syndiotactic 1,2-polybutadiene within an aliphatic solvent is maintained at a temperature that is at least sufficient to maintain the supersaturated solution state. Preferably, the solution is maintained at a higher temperature than is required to maintain the solution, e.g., about 5–20° C. higher. If this minimum temperature is not maintained, the syndiotactic 1,2-polybutadiene will precipitate from the supersaturated solution to form a swollen polymer mass that exhibits the problems found in the prior art. The minimum temperature that should be maintained, like the minimum polymerization temperature, is generally a high temperature that may vary based upon the melting temperature of the syndiotactic 1,2-polybutadiene the concentration of the polymer within the supersaturated solution, and the solvent employed. Where the melting temperature of the syndiotactic 1,2-polybutadiene is in the range from about 120° to about 165° C. and the solvent employed includes at least 95% by weight of aliphatic solvents, the supersaturated solution should be preferably maintained at a temperature of at least 65° C., more preferably at least about 70° C., and even more preferably at least about 80° C. Where the melting temperature of the syndiotactic 1,2-polybutadiene is greater than about 165° C., these minimum temperatures should be increased by about 10° C. for an equivalent increase in melting temperature. Where the solvent includes from about 25% to about 50% by weight of an aromatic solvent in addition to the aliphatic solvent, the high temperature requirements can be decreased by about 10° C. to about 20° C.

While the process of this invention preferably includes maintaining the supersaturated solution at a high temperature so as to maintain the supersaturated solution state, there is no requirement that the temperature be maintained for any specific period of time. The high temperature should be maintained, however, until the polymer is isolated from the supersaturated solution; i.e., the polymer is isolated from the solvent, in order to facilitate processing. The supersaturated solution state can be maintained for a long-term period of time by maintaining the appropriate temperature. Advantageously, it has been found that the supersaturated solution can be maintained for periods greater than about one day, more advantageously greater than about five days, and even more advantageously greater than about 10 days. This long-term stability of the supersaturated solution provides an ample window of time for transferring the polymer cement out of the reactor and subsequently isolating the polymer from the cement without the risks of fouling the equipment and clogging the transfer pipes.

Conventional procedures for desolventization and drying may be employed to isolate the polymer product from the cement. For example, the syndiotactic 1,2-polybutadiene may be isolated from the polymerization mixture by coagulating the polymer cement with an alcohol such as methanol, ethanol, or isopropanol, followed by filtration, or by steam distilling the solvent and the unreacted 1,3-butadiene monomer, followed by filtration. During steam distillation, the polymer could be subjected to temperatures in excess of 100° C. The isolated polymer product is then dried to remove residual amounts of solvent and water. During the drying, the polymer could be subjected to temperatures in excess of 100° C. The polymer may also be isolated by directly drum drying the polymer cement, which subjects the polymer to temperatures in excess of 140° C.

The process of this invention is particularly suitable for preparing syndiotactic 1,2-polybutadiene that has an intermediate melting temperature within the range of about 120° C. to about 165° C. Advantageously, this intermediate melting temperature syndiotactic 1,2-polybutadiene can be easily molded into various articles under mild conditions, and yet still possesses adequate crystallinity that is required for mechanical properties. Also, the intermediate melting temperature syndiotactic 1,2-polybutadiene can be easily mixed with rubbery elastomers under mild conditions during rubber compounding, and yet still possesses sufficient crystallinity that is needed to improve the properties of rubber compositions. Therefore, the syndiotactic 1,2-polybutadiene produced with the process of this invention has many uses. It can be blended into and co-cured with various natural or synthetic rubbers in order to improve the properties thereof. For example, it can be incorporated into elastomers in order to improve the green strength of those elastomers, particularly in tires. The supporting or reinforcing carcass of tires is particularly prone to distortion during tire building and curing procedures. For this reason, the incorporation of the syndiotactic 1,2-polybutadiene into rubber compositions that are utilized in the supporting carcass of tires has particular utility in preventing or minimizing this distortion. In addition, the incorporation of the syndiotactic 1,2-polybutadiene into tire tread compositions can reduce the heat build-up and improve the tear and wear resistance of tire treads. The syndiotactic 1,2-polybutadiene is also useful in the manufacture of films and packaging materials and in many molding applications.

In order to demonstrate the practice of the present invention, the following examples have been prepared and tested. The examples should not, however, be viewed as limiting the scope of the invention. The claims will serve to define the invention.

EXAMPLES

Example 1

An oven-dried 1-liter glass bottle was capped with a self-sealing rubber liner and a perforated metal cap. After the bottle was thoroughly purged with a stream of dry nitrogen gas, the bottle was charged with 103 g of hexanes and 230 g of a 1,3-butadiene/hexanes blend containing 21.7% by weight of 1,3-butadiene. The following catalyst ingredients were then added to the bottle in the following order: (1) 0.050 mmol of iron(III) 2-ethylhexanoate, (2) 0.20 mmol of bis(2-ethylhexyl) hydrogen phosphite, and (3) 0.65 mmol of tri-n-butylaluminum. The bottle was tumbled for 1.5 hours in a water bath maintained at 80° C. The resulting polymerization mixture was a low-viscosity homogeneous solution that flowed readily. Upon cooling to room temperature, the solution became gelatinous due to the precipitation of syndiotactic 1,2-polybutadiene that occluded all the solvent. The gelatin could not flow. Upon reheating at 80° C. for 3 hours, the gelatin did not dissolve, indicating that the polymer cement formed at the end of the high-temperature polymerization is in a meta-stable supersaturated solution state. The polymerization mixture was coagulated with 3 liters of isopropanol containing 2,6-di-tert-butyl-4-methylphenol as the antioxidant. The resulting syndiotactic 1,2-polybutadiene was isolated by filtration and dried to a constant weight under vacuum at 60° C. The yield of the polymer was 49.1 g (98% yield). As measured by differential scanning calorimetry (DSC), the polymer had a melting temperature of 148° C. The $^1$H and $^{13}$C nuclear magnetic resonance (NMR) spectroscopic analyses of the polymer indicated a 1,2-linkage content of 89.7% and a syndiotacticity of 81.6%. As determined by gel permeation chromatography (GPC), the polymer had a number average molecular weight ($M_n$) of 209,000, a weight average molecular weight ($M_w$) of 407,000, and a polydispersity index ($M_w/M_n$) of 2.0. The monomer charge, the amounts of the catalyst ingredients, and the properties of the resulting syndiotactic 1,2-polybutadiene are summarized in Table I.

TABLE I

| Example No. | 1 | 2 | 3 | 4 |
|---|---|---|---|---|
| Hexanes (g) | 105 | 105 | 105 | 105 |
| 21.9% 1,3-Bd/hexanes (g) | 228 | 228 | 228 | 228 |
| Fe(2-EHA)$_3$ (mmol) | 0.050 | 0.050 | 0.050 | 0.050 |
| Bis(2-ethylhexyl)hydrogen phosphite | 0.20 | 0.20 | 0.20 | 0.20 |
| n-Bu$_3$Al (mmol) | 0.65 | 0.65 | 0.75 | 0.80 |
| Fe/P/Al molar ratio | 1:4:13 | 1:4:14 | 1:4:15 | 1:4:16 |
| Polymer yield after 1.5 hr at 80° C. | 98% | 99% | 98% | 99% |
| Melting temperature (° C.) | 148 | 146 | 148 | 148 |
| $M_n$ | 209,00 | 198,000 | 182,000 | 181,000 |
| $M_w$ | 407,000 | 389,000 | 382,000 | 394,000 |
| $M_w/M_n$ | 2.0 | 2.0 | 2.1 | 2.2 |

Examples 2–4

In Examples 2–4, the procedure described in Example 1 was repeated except that the catalyst ingredient ratio was varied as shown in Table I. The monomer charge, the amounts of the catalyst ingredients, and the properties of the resulting syndiotactic 1,2-polybutadiene are summarized in Table I. In all cases, a low-viscosity supersaturated solution was obtained at the end of the polymerization.

Example 5

In Example 5, the procedure of Example 1 was repeated except that, at the end of the polymerization, the resulting polymer solution was aged at 80° C. for 6 days. It was found that the aged polymer cement remained in a supersaturated solution state although it had turned slightly hazy.

Example 6

In Example 6, the procedure of Example 5 was repeated except that, at the end of the polymerization, the resulting polymer solution was terminated with 1 mL of isopropanol and then aged at 80° C. for 6 days. It was found that the aged polymer cement remained in a supersaturated solution state although it had turned slightly hazy.

The results described in Examples 5 and 6 indicate that the meta-stable supersaturated solution of syndiotactic 1,2-polybutadiene obtained by the high-temperature polymerization process of this invention can be maintained for a prolonged period of time with the proviso that the polymer cement is maintained at a high temperature.

Comparative Examples 7–10

In Comparative Examples 7–10, the procedure described in Example 1 was repeated except that the polymerization was conducted for 4 hours in a water bath maintained at 50° C., and the catalyst ingredient ratio was varied as shown in Table II. In all cases, the resulting polymerization mixture was a gelatin that could not flow. The $^1$H and $^{13}$C NMR spectroscopic analyses of the polymer made in Example 9 indicated a 1,2-linkage content of 87.0% and a syndiotacticity of 77.7%. The monomer charge, the amounts of the catalyst ingredients, and the properties of the resulting syndiotactic 1,2-polybutadiene are summarized in Table II.

TABLE II

| Comparative Example No. | 7 | 8 | 9 | 10 |
| --- | --- | --- | --- | --- |
| Hexanes (g) | 105 | 105 | 105 | 105 |
| 21.9% 1,3-Bd/hexanes (g) | 228 | 228 | 228 | 228 |
| Fe(2-EHA)$_3$ (mmol) | 0.050 | 0.050 | 0.050 | 0.050 |
| Bis(2-ethylhexyl)hydrogen phosphite | 0.20 | 0.20 | 0.20 | 0.20 |
| n-Bu$_3$Al (mmol) | 0.65 | 0.65 | 0.75 | 0.80 |
| Fe/P/Al molar ratio | 1:4:13 | 1:4:14 | 1:4:15 | 1:4:16 |
| Polymer yield after 4 hr at 50° C. | 99% | 97% | 96% | 95% |
| Melting temperature (° C.) | 131 | 131 | 133 | 133 |
| M$_n$ | 185,000 | 186,000 | 191,000 | 182,000 |
| M$_w$ | 442,000 | 442,000 | 424,000 | 418,000 |
| M$_w$/M$_n$ | 2.4 | 2.4 | 2.2 | 2.3 |

A comparison of the results obtained in Examples 1–6 with those obtained in Comparative Examples 7–10 indicates that the polymerization of 1,3-butadiene in hexanes must be conducted at a high temperature (80° C.) in order to obtain a polymerization mixture in a supersaturated solution state, and the resulting polymer cement must be maintained at a high temperature in order to remain in the supersaturated solution state.

Examples 11–13

In Examples 11–13, the procedure described in Example 1 was repeated except that triethylaluminum was substituted for tri-n-butylaluminum, and the catalyst ingredient ratio was varied as shown in Table III. In all cases, the resulting polymerization mixture was a low-viscosity homogeneous solution that flowed readily. Upon cooling to room temperature, the solution became a jello due to the precipitation of syndiotactic 1,2-polybutadiene that occluded all the solvent. The gelatin could not flow. Upon reheating at 80° C. for 3 hours, the gelatin did not dissolve, indicating that the polymer cement formed at the end of the high-temperature polymerization is in a meta-stable supersaturated solution state. The monomer charge, the amounts of the catalyst ingredients, and the properties of the resulting syndiotactic 1,2-polybutadiene are summarized in Table III.

TABLE III

| Example No. | 11 | 12 | 13 |
| --- | --- | --- | --- |
| Hexanes (g) | 105 | 105 | 105 |
| 21.9% 1,3-Bd/hexanes (g) | 228 | 228 | 228 |
| Fe(2-EHA)$_3$ (mmol) | 0.050 | 0.050 | 0.050 |
| Bis(2-ethylhexyl)hydrogen phosphite | 0.20 | 0.20 | 0.20 |
| Et$_3$Al (mmol) | 0.65 | 0.75 | 0.80 |
| Fe/P/Al molar ratio | 1:4:14 | 1:4:15 | 1:4:16 |
| Polymer yield after 1.5 hr at 80° C. | 96% | 96% | 94% |
| Melting temperature (° C.) | 147 | 145 | 145 |
| M$_n$ | 223,000 | 243,000 | 265,000 |
| M$_w$ | 464,000 | 467,000 | 441,000 |
| M$_w$/M$_n$ | 2.1 | 1.9 | 1.7 |

Comparative Examples 14–16

In Comparative Examples 14–16, the procedure described in Example 1 was repeated except that triethylaluminum was substituted for tri-n-butylaluminum, the polymerization was conducted for 4 hours in a water bath maintained at 50° C., and the catalyst ingredient ratio was varied as shown in Table IV. In all cases, the resulting polymerization mixture was a gelatin that could not flow. The $^1$H and $^{13}$C NMR spectroscopic analyses of the polymer made in Example 15 indicated a 1,2-linkage content of 88.3% and a syndiotacticity of 76.1%. The monomer charge, the amounts of the catalyst ingredients, and the properties of the resulting syndiotactic 1,2-polybutadiene are summarized in Table IV.

TABLE IV

| Comparative Example No. | 14 | 15 | 16 |
| --- | --- | --- | --- |
| Hexanes (g) | 105 | 105 | 105 |
| 21.9% 1,3-Bd/hexanes (g) | 228 | 228 | 228 |
| Fe(2-EHA)$_3$ (mmol) | 0.050 | 0.050 | 0.050 |
| Bis(2-ethylhexyl)hydrogen phosphite | 0.20 | 0.20 | 0.20 |
| Et$_3$Al (mmol) | 0.65 | 0.75 | 0.80 |
| Fe/P/Al molar ratio | 1:4:14 | 1:4:15 | 1:4:16 |
| Polymer yield after 4 hr at 50° C. | 94% | 90% | 80% |
| Melting temperature (° C.) | 133 | 133 | 132 |
| M$_n$ | 223,000 | 226,000 | 188,000 |
| M$_w$ | 536,000 | 512,000 | 523,000 |
| M$_w$/M$_n$ | 2.4 | 2.3 | 2.8 |

A comparison of the results obtained in Examples 11–13 with those obtained in Comparative Examples 14–16 indicates that the polymerization of 1,3-butadiene in hexanes must be conducted at a high temperature (80° C.) in order to obtain a polymerization mixture in a supersaturated solution state, and the resulting polymer cement must be maintained at a high temperature in order to remain in the supersaturated solution state.

Example 17

A two-gallon stainless-steel reactor was charged with 1415 g of hexanes, 3121 g of a 1,3-butadiene/hexanes blend containing 21.8% by weight of 1,3-butadiene, 0.680 mmol of iron(III) 2-ethylhexanoate, 2.72 mmol of bis(2- ethylhexyl) hydrogen phosphite, and 9.53 mmol of tri-n-butylaluminum. The temperature of the reactor jacket was set at 82° C., and the polymerization was carried out for 2 hours. The polymerization was terminated by adding 4 mL of isopropanol followed by 5.4 g of tris(nonylphenyl) phosphite and 20 g of 2,6-di-tert-butyl-4-methylphenol. The hot polymerization mixture was easily transferred out of the reactor via a steel pipe (0.5 inch ID). After the polymer cement was removed from the reactor, visual inspection of the interior of the reactor revealed that the reactor was clean with no fouling. The resulting syndiotactic 1,2-polybutadiene was dried to a constant weight under vacuum at 60° C. The yield of the polymer was 646 g (95% yield). As measured by DSC, the polymer had a melting temperature of 146° C. As determined by GPC, the polymer had a number average molecular weight ($M_n$) of 168,000, a weight average molecular weight ($M_w$) of 361,000, and a polydispersity index ($M_w/M_n$) of 2.1.

Comparative Example 18

The polymerization was conducted according to the procedure described in Example 17. After the polymerization was terminated, the polymerization mixture was cooled to room temperature, and it became a gelatin due to the precipitation of syndiotactic 1,2-polybutadiene that occluded all the solvent. The gelatin could not flow. Upon reheating at 80° C. for 3 hours, the gelatin did not dissolve, indicating that the polymer cement formed at the end of the high-temperature polymerization is in a meta-stable supersaturated solution state. The gelatin could not be transferred out of the reactor via a steel pipe, and the reactor had to be opened to recover the polymer.

A comparison of the results obtained in Example 17 with those obtained in Comparative Example 18 indicates that the meta-stable supersaturated solution obtained by the high-temperature polymerization must be maintained at a high temperature so that it remains in the supersaturated solution state in order to be easily transferred out of the reactor.

Example 19

An oven-dried 1-liter glass bottle was capped with a self-sealing rubber liner and a perforated metal cap. After the bottle was thoroughly purged with a stream of dry nitrogen gas, the bottle was charged with 94 g of hexanes and 206 g of a 1,3-butadiene/hexanes blend containing 21.8% by weight of 1,3-butadiene. The following catalyst ingredients were then added to the bottle in the following order: (1) 0.045 mmol of iron(III) 2-ethylhexanoate, (2) 0.18 mmol of 2-oxo-(2H)-5-butyl-5-ethyl-1,3,2-dioxaphosphorinane, and (3) 0.59 mmol of triisobutylaluminum. The bottle was tumbled for 3 hours in a water bath maintained at 80° C. The resulting polymerization mixture was a slightly hazy solution that flowed. Upon cooling to room temperature, the solution became a gelatin due to the precipitation of syndiotactic 1,2-polybutadiene that occluded all the solvent. The gelatin could not flow. Upon reheating at 80° C. for 3 hours, the lump did not dissolve, indicating that the polymer cement formed at the end of high-temperature polymerization is in a meta-stable supersaturated solution state. The polymerization mixture was coagulated with 3 liters of isopropanol containing 2,6-di-tert-butyl-4-methylphenol as the antioxidant. The resulting syndiotactic 1,2-polybutadiene was isolated by filtration and dried to a constant weight under vacuum at 60° C. The yield of the polymer was 41.1 g (91% yield). The monomer charge, the amounts of the catalyst ingredients, and the properties of the resulting syndiotactic 1,2-polybutadiene are summarized in Table V.

TABLE V

| Example No. | 19 | 20 | 21 |
|---|---|---|---|
| Hexanes (g) | 94 | 94 | 94 |
| 21.8% 1,3-Bd/hexanes (g) | 206 | 206 | 206 |
| Fe(2-EHA)$_3$ (mmol) | 0.045 | 0.045 | 0.045 |
| 2-Oxo-(2H)-5-butyl-5-ethyl-1,3,2-dioxaphosphorinane | 0.18 | 0.18 | 0.18 |
| i-Bu$_3$Al (mmol) | 0.59 | 0.63 | 0.68 |
| Fe/P/Al molar ratio | 1:4:13 | 1:4:14 | 1:4:15 |
| Polymer yield after 3 hr at 80° C. | 91% | 90% | 89% |
| Melting temperature (° C.) | 150 | 151 | 151 |

Examples 20 and 21

In Examples 20 and 21, the procedure described in Example 19 was repeated except that the catalyst ingredient ratio was varied as shown in Table V. The monomer charge, the amounts of the catalyst ingredients, and the properties of the resulting syndiotactic 1,2-polybutadiene are summarized in Table V. In all cases, a low-viscosity solution was obtained at the end of the polymerization.

Comparative Examples 22–24

In Comparative Examples 22–24, the procedure described in Example 19 was repeated except that the polymerization was conducted for 5 hours in a water bath maintained at 65° C., and the catalyst ingredient ratio was varied as shown in Table VI. In all cases, the resulting polymerization mixture was a gelatin that could not flow. The monomer charge, the amounts of the catalyst ingredients, and the properties of the resulting syndiotactic 1,2-polybutadiene are summarized in Table VI.

TABLE VI

| Comparative Example No. | 22 | 23 | 24 |
|---|---|---|---|
| Hexanes (g) | 94 | 94 | 94 |
| 21.8% 1,3-Bd/hexanes (g) | 206 | 206 | 206 |
| Fe(2-EHA)$_3$ (mmol) | 0.045 | 0.045 | 0.045 |
| 2-Oxo-(2H)-5-butyl-5-ethyl-1,3,2-dioxaphosphorinane | 0.18 | 0.18 | 0.18 |
| i-Bu$_3$Al (mmol) | 0.59 | 0.63 | 0.68 |
| Fe/P/Al molar ratio | 1:4:13 | 1:4:14 | 1:4:15 |
| Polymer yield after 5 hr at 65° C. | 89% | 91% | 90% |
| Melting temperature (° C.) | 152 | 153 | 153 |

A comparison of the results obtained in Examples 19–21 with those obtained in Comparative Examples 22–24 indicates that the polymerization of 1,3-butadiene in hexanes must be conducted at a high temperature (80° C.) in order to obtain a polymerization mixture in a supersaturated solution state, and the resulting polymer cement must be maintained at a high temperature in order to remain in the supersaturated solution state.

Examples 25–27

In Examples 25–27, the procedure described in Example 19 was repeated except that triethylaluminum was substituted for triisobutylaluminum, the catalyst ingredient ratio was varied as shown in Table VII, and the polymerization was conducted for 4 hours at 80° C. In all cases, the resulting polymerization mixture was a low-viscosity homogeneous solution that flowed readily. The monomer charge, the amounts of the catalyst ingredients, and the properties of the resulting syndiotactic 1,2-polybutadiene are summarized in Table VII.

TABLE VII

| Example No. | 25 | 26 | 27 |
|---|---|---|---|
| Hexanes (g) | 44 | 44 | 44 |
| 21.8% 1,3-Bd/hexanes (g) | 229 | 229 | 229 |
| Fe(2-EHA)$_3$ (mmol) | 0.10 | 0.10 | 0.10 |
| 2-Oxo-(2H)-5-butyl-5-ethyl-1,3,2-dioxaphosphorinane | 0.40 | 0.40 | 0.40 |
| Et$_3$Al (mmol) | 1.20 | 1.30 | 1.40 |
| Fe/P/Al molar ratio | 1:4:12 | 1:4:13 | 1:4:14 |
| Polymer yield after 4 hr at 80° C. | 86% | 84% | 62% |
| Melting temperature (° C.) | 134 | 133 | 134 |

Comparative Examples 28–30

In Comparative Examples 28–30, the procedure described in Example 19 was repeated except that triethylaluminum was substituted for triisobutylaluminum, the polymerization was conducted for 5 hours in a water bath maintained at 50° C., and the catalyst ingredient ratio was varied as shown in Table VIII. In all cases, the resulting polymerization mixture was a gelatin that could not flow. The monomer charge, the amounts of the catalyst ingredients, and the properties of the resulting syndiotactic 1,2-polybutadiene are summarized in Table VIII.

TABLE VIII

| Example No. | 28 | 29 | 30 |
|---|---|---|---|
| Hexanes (g) | 44 | 44 | 44 |
| 21.8% 1,3-Bd/hexanes (g) | 229 | 229 | 229 |
| Fe(2-EHA)$_3$ (mmol) | 0.10 | 0.10 | 0.10 |
| 2-Oxo-(2H)-5-butyl-5-ethyl-1,3,2-dioxaphosphorinane | 0.40 | 0.40 | 0.40 |
| Et$_3$Al (mmol) | 1.20 | 1.30 | 1.40 |
| Fe/P/Al molar ratio | 1:4:12 | 1:4:13 | 1:4:14 |
| Polymer yield after 5 hr at 50° C. | 85% | 76% | 53% |
| Melting temperature (° C.) | 139 | 140 | 140 |

A comparison of the results obtained in Examples 25–27 with those obtained in Comparative Examples 28–30 indicates that the polymerization of 1,3-butadiene in hexanes must be conducted at a high temperature (80° C.) in order to maintain the polymerization mixture in a supersaturated solution state, and the resulting polymer cement must be maintained at a high temperature in order to remain in the supersaturated solution state.

Various modifications and alterations that do not depart from the scope and spirit of this invention will become apparent to those skilled in the art. This invention is not to be duly limited to the illustrative embodiments set forth herein.

What is claimed is:

1. A process for synthesizing syndiotactic 1,2-polybutadiene, the process comprising the steps of:
   (1) polymerizing monomer consisting essentially of 1,3-butadiene monomer within an organic solvent that includes at least 50% by weight of aliphatic solvent by using an iron-based catalyst composition, where said step of polymerizing occurs at a temperature above about 65° C., thereby forming a supersaturated solution of syndiotactic 1,2-polybutadiene;
   (2) maintaining the supersaturated solution of syndiotactic 1,2-polybutadiene at a temperature above about 65° C. until isolation of the syndiotactic 1,2-polybutadiene; and
   (3) isolating the syndiotactic 1,2-polybutadiene from the supersaturated solution.

2. The process of claim 1, where the solvent includes at least 85% by weight of aliphatic solvents.

3. The process of claim 2, where the solvent includes at least 95% by weight of aliphatic solvents.

4. The process of claim 3, where the solvent consists essentially of technical-grade hexane.

5. The process of claim 1, where said step of polymerizing occurs at a temperature above about 70° C.

6. The process of claim 1, where said step of polymerizing occurs at a temperature above about 80° C.

7. The process of claim 1, where the iron-based catalyst composition is formed by combining (a) an iron-containing compound, (b) a hydrogen phosphite, and (c) an organoaluminum compound.

8. The process of claim 7, where the organoaluminum compound includes a aluminoxane.

9. The process of claim 7 where the molar ratio of the organoaluminum compound to the iron-containing compound (Al/Fe) is at least about 12:1.

10. The process of claim 9 where the molar ratio of the organoaluminum compound to the iron-containing compound (Al/Fe) is at least about 13:1.

11. The process of claim 10 where the molar ratio of the organoaluminum compound to the iron-containing compound (Al/Fe) is at least about 14:1.

12. A process for synthesizing syndiotactic 1,2-polybutadiene, the process comprising the steps of:
   (1) polymerizing 1,3-butadiene monomer within an aliphatic solvent by using an iron-based catalyst composition, where said step of polymerizing occurs at a temperature above about 65° C., thereby forming a supersaturated solution of syndiotactic 1,2-polybutadiene;
   (2) maintaining the supersaturated solution of syndiotactic 1,2-polybutadiene at a temperature above about 65° C. until isolation of the syndiotactic 1,2-polybutadiene; and
   (3) isolating the syndiotactic 1,2-polybutadiene from the supersaturated solution.

13. The process of claim 12, where the iron-based catalyst composition is formed by combining (a) an iron-containing compound, (b) a hydrogen phosphite, and (c) an organoaluminum compound.

14. The process of claim 13, where the molar ratio of the organoaluminum compound to the iron-containing compound (Al/Fe) is at least about 12:1.

15. A process for synthesizing syndiotactic 1,2-polybutadiene wherein an iron-based catalyst system is employed to polymerize 1,3-butadiene monomer within an organic solvent comprising an aliphatic solvent, the improvement comprising:
   (1) conducting the polymerization at a temperature above 65° C. to form a supersaturated solution of syndiotactic 1,2-polybutadiene; and
   (2) maintaining the supersaturated solution at a temperature above about 65° C. until the isolation of the syndiotactic 1,2-polybutadiene.

16. The process of claim 15, further comprising the step of isolating the syndiotactic 1,2-polybutadiene from the supersaturated solution.

17. The process of claim 15, where the iron-based catalyst composition is formed by combining (a) an iron-containing compound, (b) a hydrogen phosphite, and (c) an organoaluminum compound.

18. The process of claim 17, where the molar ratio of the organoaluminum compound to the iron-containing compound (Al/Fe) is at least about 12:1.

* * * * *